United States Patent
Byrne et al.

(10) Patent No.: US 10,929,293 B2
(45) Date of Patent: Feb. 23, 2021

(54) ATOMIC OPERATIONS FOR FABRIC SHARED MEMORIES

(71) Applicant: HEWLETT PACKARD ENTERPRISE DEVELOPMENT LP, Houston, TX (US)

(72) Inventors: John L. Byrne, Pasadena, CA (US); Harumi Kuno, Cupertino, CA (US); Khemraj Shukla, Oklahoma City, OK (US); Wei Zhang, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/967,188

(22) Filed: Apr. 30, 2018

(65) Prior Publication Data
US 2019/0332529 A1    Oct. 31, 2019

(51) Int. Cl.
| | | |
|---|---|---|
| *G06F 12/08* | (2016.01) | |
| *G06F 12/084* | (2016.01) | |
| *G06F 12/0808* | (2016.01) | |
| *G06F 12/0806* | (2016.01) | |
| *G06F 12/02* | (2006.01) | |
| *G06F 12/0842* | (2016.01) | |

(Continued)

(52) U.S. Cl.
CPC ........ *G06F 12/084* (2013.01); *G06F 12/0223* (2013.01); *G06F 12/0284* (2013.01); *G06F 12/0806* (2013.01); *G06F 12/0808* (2013.01); *G06F 12/0842* (2013.01); *G06F 9/467* (2013.01); *G06F 12/0811* (2013.01); *G06F 2212/6042* (2013.01)

(58) Field of Classification Search
CPC .... G06F 3/0659; G06F 9/467; G06F 12/0804; G06F 9/3004; G06F 9/466; G06F 9/3834; G06F 9/3857; G06F 9/3885
See application file for complete search history.

(56) References Cited

U.S. PATENT DOCUMENTS

| | | | |
|---|---|---|---|
| 6,629,152 B2 | 9/2003 | Kingsbury et al. | |
| 2003/0023822 A1* | 1/2003 | Scott | G06F 12/1433 |
| | | | 711/163 |

(Continued)

OTHER PUBLICATIONS

Dreseler et al., Hardware-Accelerated Memory Operations on LargeScale NUMA Systems, Sep. 2017 (8 pages).

(Continued)

*Primary Examiner* — Reginald G Bragdon
*Assistant Examiner* — Thanh D Vo
(74) *Attorney, Agent, or Firm* — Trop, Pruner & Hu, P.C.

(57) ABSTRACT

A system includes a plurality of processes, a network fabric, and a shared memory accessible by the plurality of processes over the network fabric, the shared memory to store a plurality of elements of a data structure. A first process is designated as being allowed to update a target variable stored in the shared memory, and a second process of the plurality of processes writes a request for an atomic operation to a first region in the shared memory. The first process is responsive to the request to perform the atomic operation that updates the target variable, and write a result including a value of the updated target variable to a second region in the shared memory, the second region readable by the second process, the request and the result being elements of the data structure.

18 Claims, 6 Drawing Sheets

(51) Int. Cl.
  *G06F 12/0811* (2016.01)
  *G06F 9/46* (2006.01)

(56) References Cited

U.S. PATENT DOCUMENTS

| | | | | |
|---|---|---|---|---|
| 2008/0151765 | A1* | 6/2008 | Cheruvathery | H04J 3/0632 370/252 |
| 2010/0017581 | A1 | 1/2010 | Clift et al. | |
| 2010/0318758 | A1* | 12/2010 | Agrawal | G06F 17/16 711/170 |
| 2015/0269065 | A1* | 9/2015 | Bourd | G06F 9/54 711/155 |
| 2015/0317182 | A1 | 11/2015 | Serebrin | |
| 2017/0103018 | A1* | 4/2017 | Yadav | G06F 12/084 |

OTHER PUBLICATIONS

Fang, Z. et al.; "Fast Synchronization on Shared-memory Multiprocessors: an Architectural Approach," 2005 (21 pages).

Gove, D.; "Atomic Operations and Lock-free Code," Mar. 3, 2017 (4 pages).

Herllhy, Maurice P., Impossibility and Universality Results for Wait-Free Synchronization, CMU-CS-88-140, May 12, 1988 (25 pages).

http://preshing.com/20130618/atomic-vs-non-atomic-operations/ ~ Preshing on Programming, Atomic vs. Non-Atomic Operations, Jun. 18, 2013 (7 pages).

https://www.mpich.org/static/docs/v3.2/www3/MPI_Win_allocate_shared.html ~ MPI_Win_allocate_shared downloaded Apr. 28, 2018 (3 pages).

Li et al., Efficient and Truly Passive MPI-3 RMA Synchronization Using InfiniBand Atomics downloaded Mar. 27, 2018 (25 pages).

Michael et al., Implementation of Atomic Primitives on Distributed Shared Memory Multiprocessors, 1995 (10 pages).

Shamis et al., Development and Extension of Atomic Memory Operations in OpenSHMEM, 2014 (4 pages).

Wikipedia. Linearizability last edited on Apr. 13, 2018 (6 pages).

Wikipedia, Message Passing Interface last edited on Jan. 30, 2018 (9 pages).

* cited by examiner

ATOMIC OPERATIONS FOR FABRIC SHARED MEMORIES

BACKGROUND

A distributed system can include a number of computing nodes coupled over a network fabric. Processes can be executed on the computing nodes. In addition, a memory coupled to the network fabric can be shared by the multiple processes.

BRIEF DESCRIPTION OF THE DRAWINGS

Some implementations of the present disclosure are described with respect to the following figures.

Figure 1:
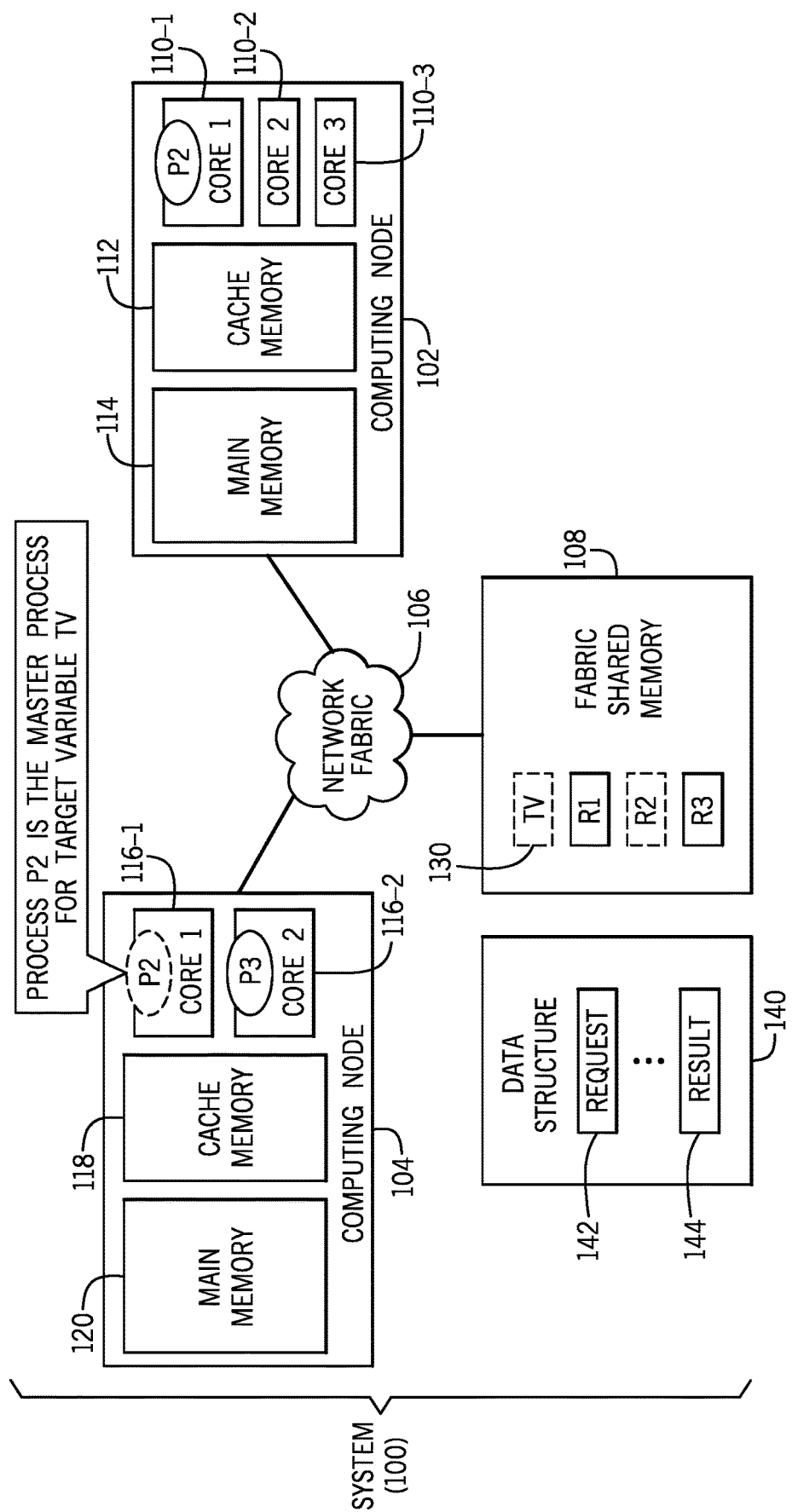
FIG. 1 is a block diagram of an arrangement that includes computing nodes and a fabric shared memory, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In concurrent programming, an atomic operation is an operation whose execution is guaranteed to appear to the rest of a system as isolated from interrupts, signals, concurrent processes, and threads. Typically, atomic operations involve a state that is stored in a memory that is shared by multiple processes. For example, an atomic fetch-and-add operation can, without interruption, retrieve the value stored at a given memory location, increment the value by some delta, store the incremented value at the given memory location (replacing the original value), and return the incremented value.

In some examples, in a system that has a shared memory accessible over a fabric (referred to as a "fabric shared memory" in the present discussion), atomic operations can employ special hardware components to support a set of base atomic operations. The hardware components are to ensure the non-interruptible feature of atomic operations. Alternatively, a distributed message-based mechanism can be used to protect (from interruption) critical sections of atomic operations—namely those sections of code that read or modify the values of protected target variables. A hardware-based mechanism to support atomic operations performed with respect to data stored in a fabric shared memory can be costly to implement. Message-based mechanisms for supporting atomic operations of values stored in fabric shared memories can be complex to implement (since an entire messaging framework has to be deployed), or can be slow.

In accordance with some implementations of the present disclosure, to support atomic operations performed on a target variable stored in a fabric shared memory, a data structure can be allocated in the fabric shared memory to allow the atomic operations to be requested and results to be returned. A "variable" can refer to a data element (or group of data elements) that can be set to a value (or values).

The data structure includes multiple elements that can be stored in memory regions (of the fabric shared memory) that are allocated to respective different processes in a system. A first process can be referred to as a "master process," which is designated to be allowed to update the target variable in the fabric shared memory, while another process (referred to as a "participating process") is not allowed to update the target variable in the fabric shared memory.

The participating process is able to write a request for an atomic operation to a first memory region of the multiple memory regions of the fabric shared memory. The master process is able to read the request in the first memory region, and in response to the request, the master process performs the atomic operation that updates the target variable, and writes a result including a value of the updated target variable to a second memory region of the multiple memory regions, where the second memory region is readable by the participating process.

Note that in some examples, there can be multiple master processes and/or multiple participating processes.

FIG. 1 is a block diagram of an example system 100 that includes multiple computing nodes 102 and 104 coupled over a network fabric 106 to a fabric shared memory 108. A "computing node" can refer to any computing infrastructure in which computing tasks can be performed. In some example, a computing node includes a computer or an arrangement of computers. Alternatively, a computing node can refer to a processor, or a core of a processor that has multiple cores. In other examples, computing nodes can include other types of hardware processing circuits, such as microcontrollers, programmable integrated circuit devices, programmable gate arrays, or any other hardware processing circuits.

A "network fabric" can refer to a bus, a network, or any other type of communication link. In some examples, the network fabric 106 allows wired communications among devices coupled to the network fabric 106. In other examples, the network fabric 106 allows wireless communications among devices connected to the network fabric 106.

The fabric shared memory 108 can be implemented using a memory device or multiple memory devices. Example memory devices include any or some combination of the following: dynamic random access memories (DRAMs), static random access memories (SRAMs), flash memories, resistive memories, phase change memories, and so forth.

Although a specific number of computing nodes 102 and 104 is shown in FIG. 1, in other examples, a different number of computing nodes can be employed.

In the example of FIG. 1, the computing node 102 includes multiple processing cores 110-1, 110-2, and 110-3.

A processing core 110-1, 110-2, or 110-3 can refer to any type of hardware processing circuit, such as respective cores of a multi-core microprocessor. Alternatively, a processing core can refer to an entire microprocessor, a microcontroller, a programmable gate array, a programmable integrated circuit device, or any other type of hardware processing circuit.

The computing node 102 further includes a cache memory 112 and a main memory 114. The cache memory 112 can include a single level cache, or multiple levels of caches (e.g., level 1 or L1 cache, level 2 or L2 cache, etc.). The cache memory 112 can be used to store a portion of the data that may be present in the main memory 114. The cache memory 112 can be accessed with a higher access speed by a processing core 110-1, 110-2, or 110-3 than the main memory 114.

The computing node 104 similarly includes processing cores 116-1 and 116-2, a cache memory 118, and a main memory 120.

Although FIG. 1 shows the cache memory 112 or 118 and the main memory 114 or 120 being included in the respective computing node 102 or 104, in other examples, either or both of the cache memory and the main memory can be separate from the respective computing node. For example, the processing cores 110-1, 110-2, and 110-3 may be part of an integrated circuit die (or a stack of multiple integrated circuit dies) that form at least part of the computing node 102. The cache memory 112 and/or the main memory 114 can be on the integrated circuit die (or the stack of multiple integrated circuit dies), or can be off the integrated circuit die (or the stack of multiple integrated circuit dies).

In the example of FIG. 1, a first process P1 is executable on the processing core 110-1 of the computing node 102. A second process P2 can be executable on the processing core 116-1 of the computing node 104, and a third process P3 can be executable on the processing core 116-2 of the computing node 104. In other examples, the multiple processes P1, P2, and P3 can execute on the same computing node, such as on the same processing core or different processing cores of the same computing node. In further examples, the multiple processes P1, P2, and P3 can execute on respective different computing nodes. Although three processes are shown in FIG. 1, in other examples, the system 100 can execute just two processes or more than three processes.

The fabric shared memory 108 includes multiple memory regions, including a memory region 130 that stores a target variable (TV), a first memory region R1 allocated to the process P1, a second memory region R2 allocated to the process P2, and a third memory region R3 allocated to the process P2.

In further examples, there can be multiple target variable memory regions to store multiple respective target variables.

In a different example with just two processes P1 and P2, the fabric shared memory 108 would include the memory region 130 and just the first and second memory regions R1 and R2.

The memory region R1 is allocated such that only process P1 should write to the memory region R1. However, the memory region R1 could be read by multiple processes, including the processes P1, P2, and P3. Similarly, the memory region R2 is allocated such that only process P2 should write to the memory region R2. However, the memory region R2 could be read by multiple processes, including the processes P1, P2, and P3. Similarly, the memory region R3 is allocated such that only process P3 should write to the memory region R3, but the memory region R3 could be read by multiple processes, including the processes P1, P2, and P3.

FIG. 1 further depicts an example data structure 140, which includes elements 142 and 144, which can be written by corresponding processes to memory regions R1, R2, and R3, respectively. In the example data structure 140, the element 142 is a request element, and the element 144 is a result element. The data structure 140 can include other elements (discussed further below). The request element 142 can specify a request for an atomic operation to be performed on the target variable TV, while the result element 144 can contain a result of the atomic operation.

In the example of FIG. 1, it is assumed that the process P2 is a master process that is designated to be allowed to update the target variable TV in the memory region 130. The processes P1 and P3 are participating processes that are not allowed to update the target variable TV in the memory region 130.

To perform an atomic operation that causes an update of a value of the target variable TV, the participating process P1 or P3 writes a value of the request element 142 to the memory region R1. The master process P2 reads the value of the request element 142 from the memory region R1, and performs the corresponding atomic operation that results in an update of the value of the target value TV. The master process P2 writes a value of the result element 144 to the memory region R2, where the value of the result element 144 written to the memory region R2 contains the updated value of the target variable TV as updated by the atomic operation requested by the request element 142.

In accordance of some implementations of the present disclosure, the data structure 140 is a cache-aligned data structure. With the cache-aligned data structure 140, each element of the data structure has a size that is equal to a multiple of the width of a cache line of a cache memory (e.g., 112 or 118) and each element of the data structure starts on a cache-aligned boundary. Each cache memory 112 or 118 includes multiple cache lines, and each cache line has a cache line width.

The use of the cache-aligned data structure 140 that maps to respective regions of the fabric shared memory 108 allows for each process P1, P2, or P3 to perform operations that use the local cache memory 112 or 118 to store values, such that the process P1, P2, or P3 can update values in their assigned regions independently without locking. Once the operations in the local cache memory are complete (e.g., after respective elements of the cache-aligned data structure 140 have been written to the corresponding cache memory), a flush operation can be performed to persist the elements written to the cache memory to the corresponding memory region R1, R2, or R3 of the fabric shared memory 108.

For example, to initiate an atomic operation on the target variable TV, the participating process P1 can write a value of the request element 142 (and other element(s) of the data structure 140 associated with the request element 142) to a cache line (or multiple cache lines) of the cache memory 112. Once the value of the request element 142 (and other element(s) of the data structure 140 associated with the request element 142) have been updated in the cache line(s) of the cache memory 112, a flush operation is performed to flush the updated value(s) in the cache line(s) of the cache memory 112 to the memory region R1 of the fabric shared memory 108.

Similarly, when performing the requested atomic operation that updates the value of the target variable, the process P2 writes the updated value of the result element 144 (and other element(s) of the data structure 140 associated with the result element 144) to a cache line (or multiple cache lines) of the cache memory 118. Once the value of the result element 144 (and other element(s) of the data structure 140 associated with the result element 144) have been updated in the cache line(s) of the cache memory 118, a flush operation is performed to flush the updated value(s) in the cache line(s) of the cache memory 118 to the memory region R2 of the fabric shared memory 108.

Note that the fabric shared memory 108 supports the atomic read and write of the value of a cache line of a cache memory (112 or 118) to and from the fabric shared memory 108.

By using techniques or mechanisms according to some implementations, instead of multiple processes accessing an individual protected target variable (e.g., TV) in the fabric shared memory 108, processes access respective elements of the cache-aligned data structure 140 when performing the atomic operation. The actual content of the protected target variable is managed by the master process for the target variable. For each participating process, the data structure 140 includes a cache line-sized element representing a request (142) to execute an atomic operation and a second cache line-sized element representing a result (144) of the execution of the atomic operation. Only the master process can read or write the actual target variable targeted by the atomic operation, only the master process can write to the result element 144, and only each participating process can write to its own request element.

In examples where there are multiple target variables in the fabric shared memory 108, multiple respective different master processes can be allocated for the multiple target variables. In further examples, multiple master processes can be allocated for one target variable. The multiple master processes can be assigned different priorities such that one master process can have a higher priority than another master process (which can be used as part of contention resolution when multiple master processes are contending for access to the target variable).

In some cases, the master process is selected to execute on a processing core that is "closer" (in terms of number of network hops, or faster access speed) to the fabric shared memory 108.

A master process (e.g., P2) can execute on a main processing core (e.g., any of 116-1 to 116-2 or 110-1 to 110-3) of a computing node as shown in FIG. 1. A "main" processing core refers to a processing core that is used to execute processes of an operating system and/or applications of a computing node. In other examples, a master process can execute on a different processing circuit, such as a general processing unit (GPU), a memory side accelerator (connected to the fabric shared memory 108 to perform specified functions relating to the fabric shared memory 108), a network interface controller that performs network communications (such as over the network fabric 106), a virtual process (e.g., a virtual machine, a network virtualization function or NFV, etc.), and so forth.

By using techniques according to some implementations, hardware support for atomic operations on a fabric shared memory would not have to be provided, since the execution of an atomic operation can be managed by executed processes. A separate manager does not have to be provided to maintain a state of the atomic operation, since the state is stored in the fabric shared memory regions associated with the respective processes. Messaging among the processes does not have to be performed for the atomic operation, so that complexity in the system is reduced. Also, use of a heavyweight lock or storage manager can be avoided.

Figure 2:
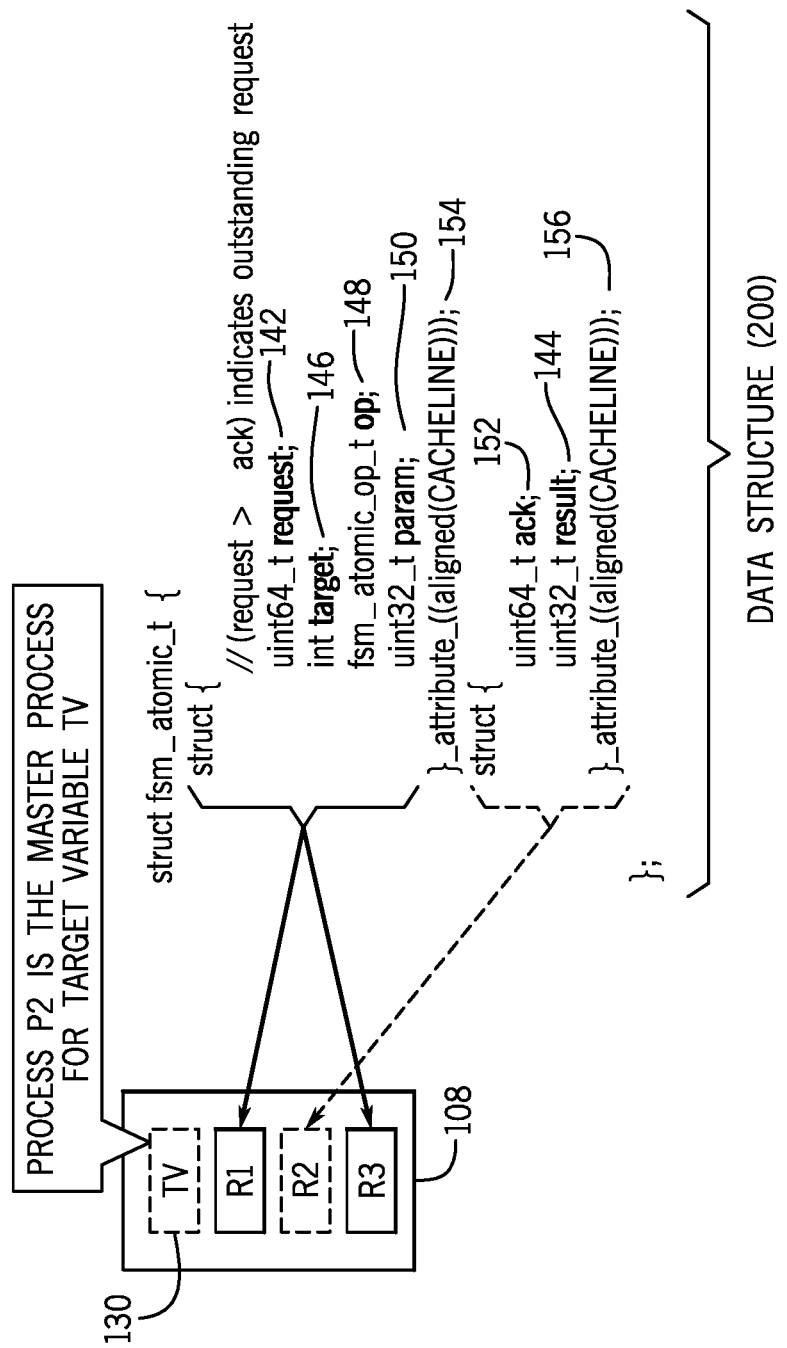
FIG. 2 illustrates an example of a cache-aligned data structure that can be stored in a fabric shared memory, according to some examples.

FIG. 2 illustrates a more specific example of a data structure 200 (named "fsm_atomic_t" in the example) that includes various elements that can be used to perform an atomic operation. In the example of FIG. 2, the atomic operation that can be requested and performed using the data structure 200 is a fetch-and-add atomic operation. The fetch-and-add operation retrieves the content of a memory location (e.g., the memory region 130 that contains a value of the target variable TV), increments the value of the target variable TV by a specified amount, and writes the incremented value of the target variable TV back to the memory location.

The data structure 200 includes the request element 142 and the result element 144. In addition, the data structure 200 includes a target element 146 that identifies the target variable (e.g., TV) that is the target of the atomic operation, an operation (op) variable 148 that identifies a type of atomic operation (e.g., fetch-and-add), a parameter (param) variable 150 that specifies the value used to update the target variable. The value of the parameter variable 150 can be added to the current target variable value. The data structure 200 further includes an acknowledge (ack) element 152 that provides an indication that the atomic operation has been completed, and the result element 144 is available and written to a corresponding memory location.

In the example of FIG. 2, the request element 142, the target element 146, the operation element 148, and the parameter element 150 can be written by the participating process P1 or P3 to the respective memory region R1 or R3 (depending on which process P1 or P3 is requesting the atomic operation).

As indicated by code 154, the elements 142, 146, 148, and 150 are cache aligned. In other words, when the elements 142, 146, 148, and 150 are written to a memory, they are written to a region that has a width of a cache line (or a multiple of a width of a cache line).

If both processes P1 and P3 are concurrently requesting atomic operations on the target variable TV, then the process P1 writes respective values of the elements 142, 146, 148, and 150 to the memory region R1, and the process P3 writes respective values of the elements 142, 146, 148, and 150 to the memory region R3. In this scenario, there is contention for access to the target variable TV, and the master process P2 is able to handle the contention (e.g., handle the atomic operation requests on a first-come-first-served basis or any other basis for handling contention for access to the target variable TV). If there are multiple master processes for the target variable TV, a different contention-handling technique can be employed (discussed further below).

The values of the elements 142, 146, 148, and 150 can be read by the master process P2 from the memory region R1 or R3. The result element 144 and the acknowledge element 152 are written to the memory region R2 by the master process P2, and the elements 144 and 152 can be read by the participating process P1 or P3 from the memory region R2.

As indicated by code 156, the elements 144 and 152 are cache aligned. In other words, when the elements 144 and 152 are written to a memory, they are written to a region that has a width of a cache line (or a multiple of a width of a cache line).

In some examples, the request element 142 is a request counter, and the acknowledge element 144 is an acknowledge counter. When a participating process wishes to initiate an atomic operation using the data structure 200, the participating process advances (increments or decrements) the request counter and writes the updated value of the request counter to the memory region of the participating process. The master process compares the value of the request counter to the value of the acknowledge counter—if the value of the request counter is different from the value of the acknowledge counter (greater than or less than depending upon whether the request counter is incremented or decremented), then the master process can make a determination that a request for an atomic operation has been initiated.

Once the master process has completed the requested atomic operation and updated the result element 144 in the memory region allocated to the master process, the master process advances (increments or decrements) the acknowledge counter. The participating process compares the value of the request counter to the value of the acknowledge counter—if the value of the request counter is the same as the value of the acknowledge counter, then the participating process can make a determination that the atomic operation has completed and the result of the atomic operation is available.

FIG. 2 shows an example of a data structure for a fetch-and-add atomic operation. In a different example, a different data structure can be defined for another type of atomic operation. An example different type of atomic operation is a compare-and-swap atomic operation. The elements of a data structure for the compare-and-swap atomic operation can include the following elements in addition to a request element, a target element, an operation element, a result element, and an acknowledge element: a compare element and a swap element. In this example, the request element, the target element, the operation element, the compare element, and the swap element can be written by a participating process to a corresponding memory region to initiate the compare-and-swap atomic operation.

The compare-and-swap atomic operation compares a current value of the target variable to a value of the compare element. If the current value of the target variable is equal to the value of the compare element, the compare-and-swap atomic operation modifies the target variable by setting the target variable equal to the value of the swap element.

Figure 3:
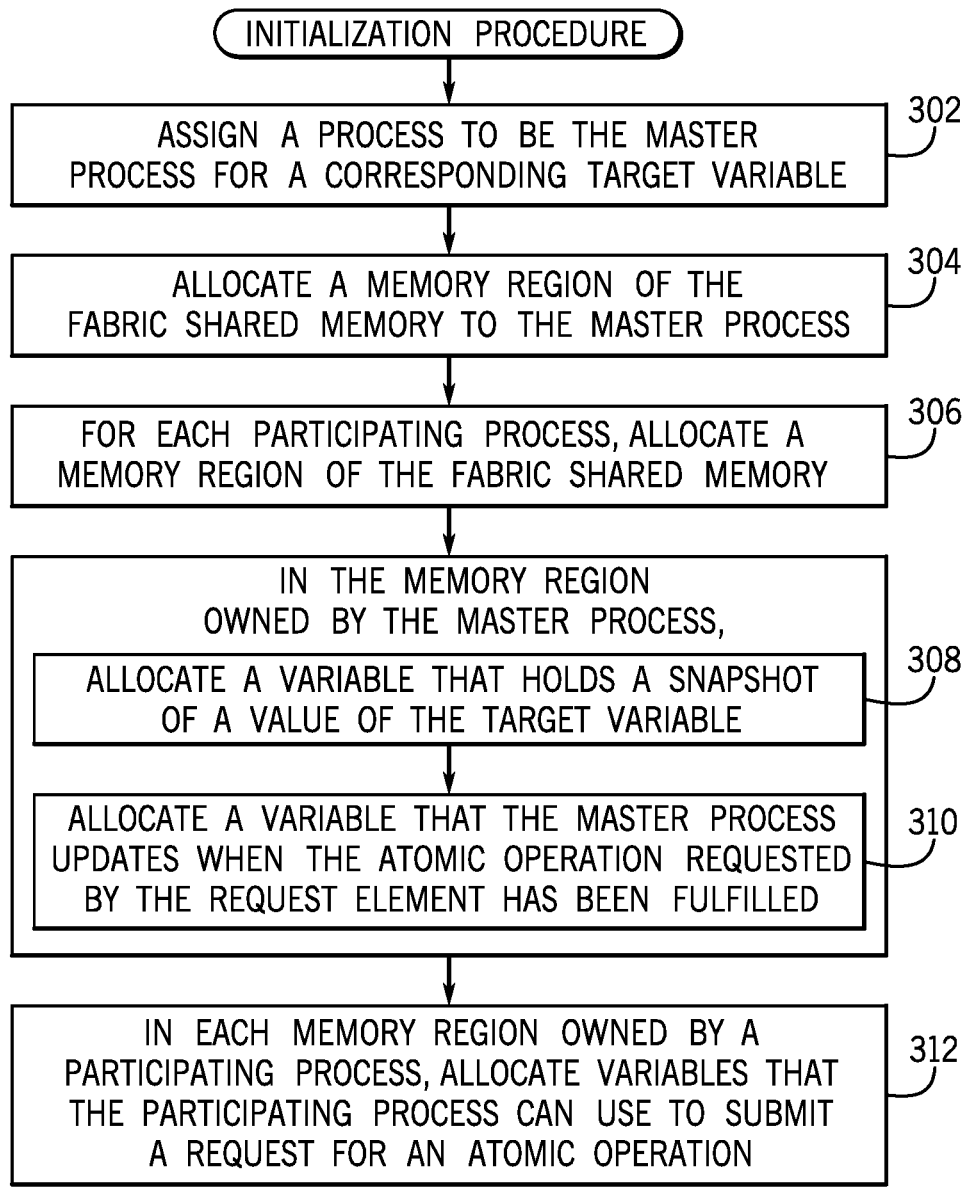
FIG. 3 is a flow diagram of an initialization procedure according to some examples.

FIG. 3 is a flow diagram of an initialization procedure according to some examples. The initialization procedure can be performed by a control process (e.g., a process of an operating system, a process of an application, etc.) executable on any of the computing nodes 102 and 104, or a different computing node. Although FIG. 3 shows an example order of tasks of the initialization procedure, the tasks can be performed in a different order in other examples, or the additional tasks or different tasks can be used.

The control process assigns (at 302) a process to be the master process for a corresponding target variable. The assignment of a process to be the master process can be performed at the time when a memory region for the target variable is allocated in the fabric shared memory 108, or at a later time (such as when an atomic operation is registered).

The assigned master process is the master process that accesses the respective target variable when performing atomic operations in response to requests of participating processes.

Different master processes can be assigned to different target variables. Moreover, in some examples, there can be multiple master processes assigned for a single target variable.

The control process allocates (at 304) a memory region of the fabric shared memory 108 to the master process. This memory region can only be written by the master process, but can be read by the master process and participating processes.

For each participating process, the control process allocates (at 306) a memory region of the fabric shared memory 108. This allocated memory region can be written only by the corresponding participating process, but can be read by the master process and other participating processes.

A memory region that is allocated to a corresponding process is owned by the corresponding process.

In the memory region owned by the master process, the control process allocates (at 308) a variable that holds a snapshot of a value of the target variable. The snapshot is a copy of the value of the target variable at a particular point in time. The control process also allocates (at 310) a variable (e.g., the acknowledge element 152 of FIG. 2) that the master process updates when the atomic operation requested by the request element has been fulfilled.

In each memory region owned by a participating process, the control process allocates (at 312) variables that the participating process can use to submit a request for an atomic operation. In the examples above, the elements can include a request element, a target element, an operation element, and a parameter element.

Figure 4:
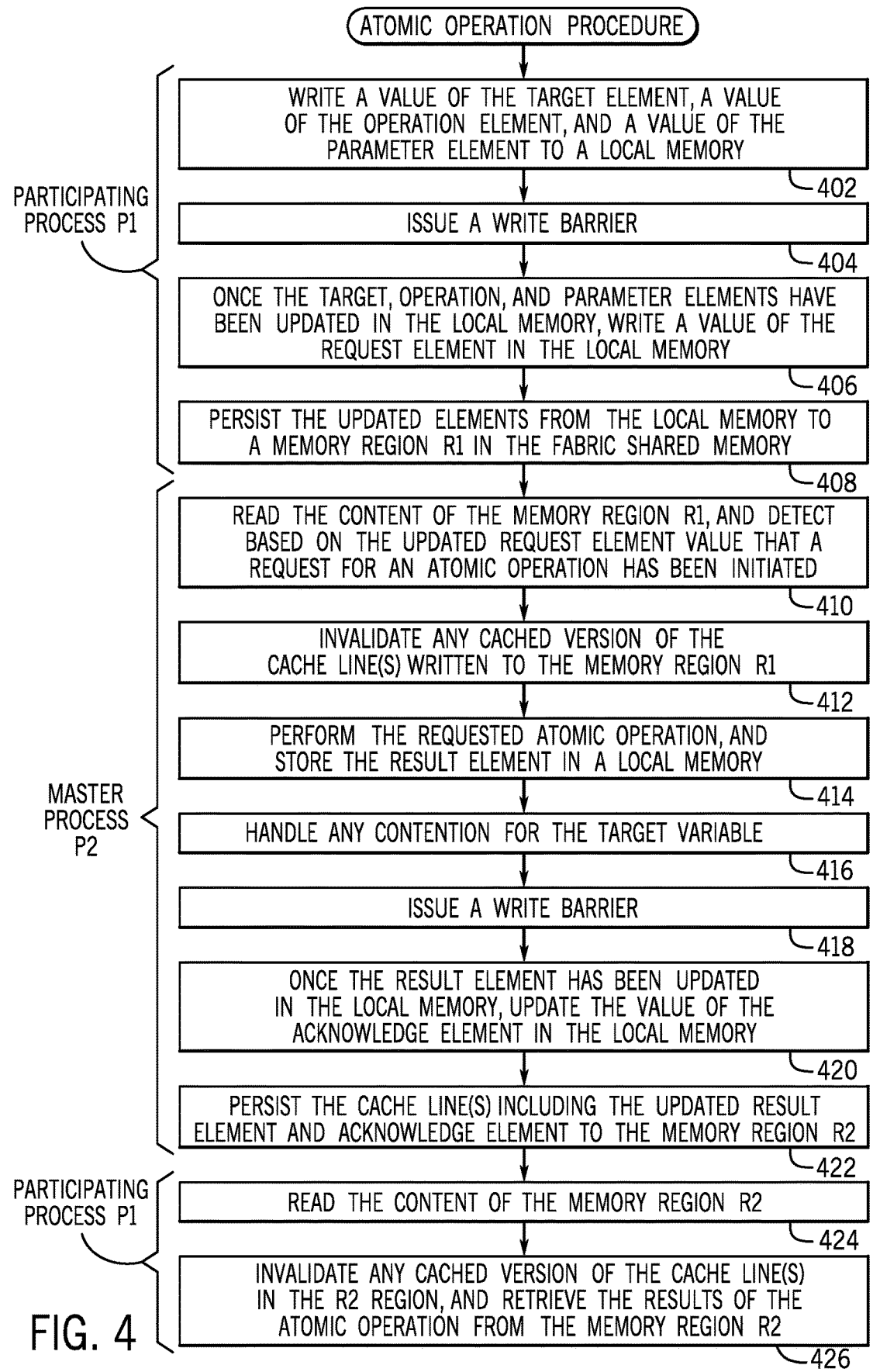
FIG. 4 is a flow diagram of an atomic operation procedure according to further examples.

FIG. 4 is a flow diagram of a procedure of performing an atomic operation. Although FIG. 4 shows an example order of tasks of the procedure of performing an atomic operation, the tasks can be performed in a different order in other examples, or the additional tasks or different tasks can be used.

A participating process (e.g., P1) writes (at 402) a value of the target element 146, a value of the operation element 148, and a value of the parameter element 150 to a local memory (e.g., the cache memory 112 of the computing node on which the participating process is executing). In the example of FIG. 4, it is assumed that the data structure 200 of FIG. 2 is used.

The participating process P1 issues (at 404) a write barrier to ensure that the foregoing target, operation, and parameter elements have been updated in the local memory. The write barrier prevents the procedure from continuing until the target, operation, and parameter elements have been updated in the local memory by the participating process P1.

Once the target, operation, and parameter elements have been updated in the local memory by the participating process P1, the participating process P1 writes (at 406) a value of the request element 142 in the local memory. If the request element is a request counter, then the participating process P1 advances (increments or decrements by 1 or a different value) the request counter in the local memory.

After the request element 142 has been updated, the participating process P1 persists (at 408) the updated elements from the local memory to a memory region (e.g., R1) in the fabric shared memory 108. The persisting can be performed by issuing a request to flush, to the fabric shared memory 108, the cache line(s) (of the cache memory 112) containing the elements that have been updated.

The master process (e.g., P2) can read (at 410) the content of the memory region R1, and can detect based on the updated request element 142 value that a request for an atomic operation has been initiated. The master process P2 can periodically poll the memory region R1, or alternatively, the master process P2 can be notified that the memory region R1 has been updated.

When the master process P2 is ready to service the atomic operation request, the master process P2 invalidates (at 412) any cached version of the cache line(s) written to the memory region R1. The master process P2 performs (at 414) the requested atomic operation, and stores the result element 144 in a local memory (e.g., the cache memory 118) of the computing node on which the master process P2 executes.

If multiple participating processes have submitted requests for atomic operations on the same target variable, there is contention for the target variable. In that case, the master process can handle (at 416) the contention for the target variable. If there is a single master process, then the master process can execute the requested atomic operation on a first-come-first-served basis (or using another contention-handling technique).

In a different example, if there are multiple master processes on a single computing node, the multiple master processes may attempt to perform the requested atomic operation on a local target variable (stored in the local memory of the computing node), and the multiple master processes can use a synchronization mechanism (e.g., based on use of a lock, a message-based synchronization mechanism, etc.) among the master processes to handle the contention for the local target variable. Once a master process has updated the local target variable in the local memory of the computing node, the updated local target variable can be flushed to the fabric shared memory 108.

In another example, there are multiple master processes on independent computing nodes. In such an example, the master processes on the computing nodes may use another distributed synchronization mechanism to ensure that the requests are managed atomically when updating the target variable in the fabric shared memory 108.

The master process P2 issues (at 418) a write barrier to ensure that the result element 144 has been updated in the local memory. The write barrier prevents the procedure from continuing until the result element 144 has been updated in the local memory by the master process P2.

Once the result element 144 has been updated in the local memory, the master process P2 then updates (at 420) the value of the acknowledge element 152 in the local memory to indicate that the atomic operation has been completed and the result is available.

The master process P2 then persists (at 422) the cache line(s) including the updated result element 144 and the updated acknowledge element 152 to the memory region R2 of the fabric shared memory 108.

The participating process reads (at 424) the content of the memory region R2, and recognizes that the master process has updated the acknowledge element 152. For example, the participating process can compare the value of the acknowledge element 152 to the value of the request element 142. If the acknowledge element 152 is equal to the request element 142, then that indicates that the master process has performed and completed the atomic operation, and that the result is available. The participating process invalidates (at 426) any cached version of the cache line(s) in the R2 region, and retrieves the results of the atomic operation from the memory region R2.

Figure 5:
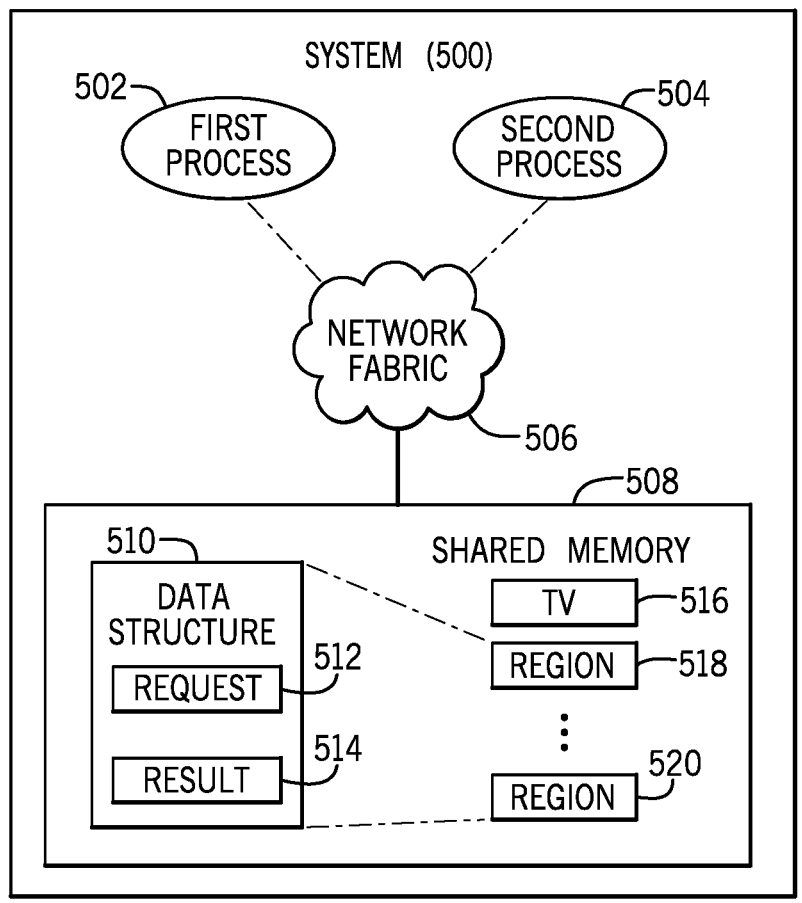
FIG. 5 is a block diagram of a system according to other examples.

FIG. 5 is a block diagram of a system 500 that includes a plurality of processes 502 and 504, and a network fabric 506. The system 500 includes a shared memory 508 accessible by the plurality of processes 502 and 504 over the network fabric 506. The shared memory 508 is to store a plurality of elements 512 and 514 of a data structure 510.

A first process 502 of the plurality of processes is designated as being allowed to update a target variable 516 stored in the shared memory 508.

A second process 504 of the plurality of processes is to write a request 512 for an atomic operation to a first region 518 in the shared memory 508.

The first process 502 is responsive to the request to perform the atomic operation that updates the target variable 516, and write a result including a value of the updated target variable to a second region 520 in the shared memory 508, the second region 520 readable by the second process 502. The request and the result are elements of the data structure 510.

Figure 6:
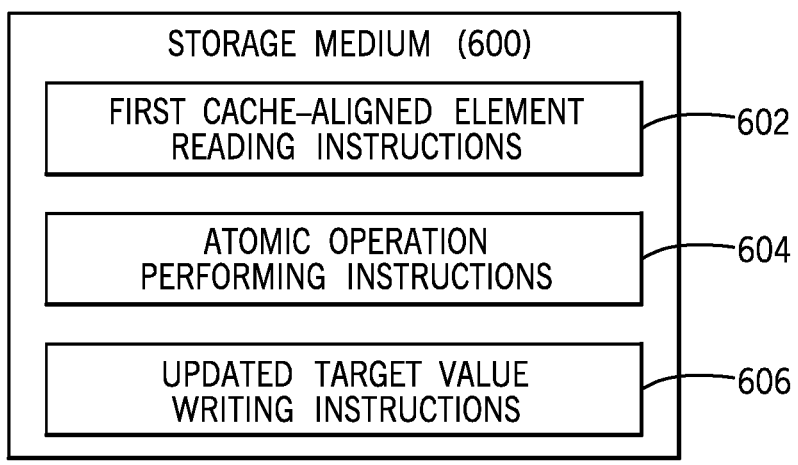
FIG. 6 is a block diagram of a storage medium storage machine-readable instructions according to some examples.

FIG. 6 is a block diagram of a non-transitory machine-readable or computer-readable storage medium 600 storing machine-readable instructions that upon execution cause a first process on a computing node to perform various tasks. The machine-readable instructions include first cache-aligned element reading instructions 602 executable to cause the first process to read a first cache-aligned element comprising a request stored in a first region in a shared memory accessible over a network fabric, the request for an atomic operation, and the first cache-aligned element written to the first region by a second process.

The machine-readable instructions include atomic operation performing instructions 604 executable to cause the first process to perform the atomic operation on a target variable stored in the shared memory, the atomic operation updating the target variable, the target variable in the shared memory updateable by the first process but not the second process.

The machine-readable instructions further include updated target value writing instructions 606 executable to cause the first process to write a value of the updated target variable as a second cache-aligned element to a second region in the shared memory, the second region readable by the second process to retrieve the value of the updated target variable.

Figure 7:
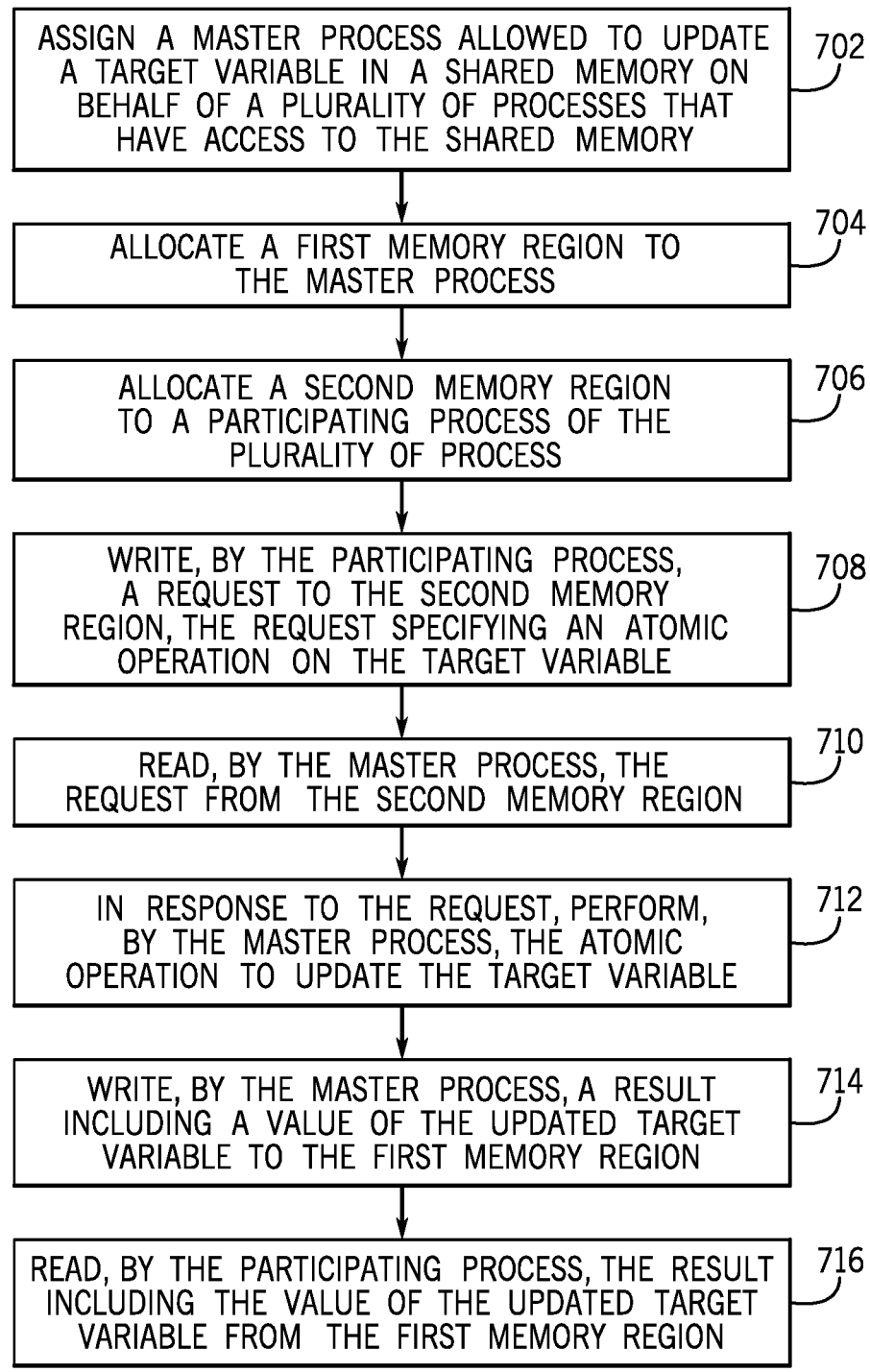
FIG. 7 is a flow diagram of a procedure according to additional examples.

FIG. 7 is a flow diagram of a procedure according to further examples. The procedure of FIG. 7 assigns (at 702) a master process allowed to update a target variable in a shared memory on behalf of a plurality of processes that have access to the shared memory, allocates (at 704) a first memory region to the master process, and allocates (at 706) a second memory region to a participating process of the plurality of processes.

The procedure of FIG. 7 writes (at 708), by the participating process, a request to the second memory region, the request specifying an atomic operation on the target variable.

The procedure reads (at 710), by the master process, the request from the second memory region. In response to the request, the procedure performs (at 712), by the master process, the atomic operation to update the target variable. The procedure writes (at 714), by the master process, a result including a value of the updated target variable to the first memory region, and reads (at 716), by the participating process, the result including the value of the updated target variable from the first memory region.

The storage medium 600 (FIG. 6) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site (e.g., a cloud) from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A system comprising:
a plurality of processes;
a network fabric;
a shared memory accessible by the plurality of processes over the network fabric, the shared memory to store a plurality of elements of a data structure;
a first process of the plurality of processes designated as being allowed to update a target variable stored in the shared memory;
a second process of the plurality of processes to write a request for an atomic operation to a first region in the shared memory, the first region in the shared memory allocated to the first process; and
the first process responsive to the request to:
perform the atomic operation that updates the target variable, and
write a result including a value of the updated target variable to a second region in the shared memory, the second region allocated to and readable by the second process, the request and the result being elements of the data structure;
wherein the first process is configured to manage the atomic operation without utilizing a hardware-specific atomic operations function and wherein the second process does not have permission to update the target variable, and
wherein the first region is writeable by the second process but not by the first process, and the second region is writeable by the first process but not by the second process.

2. The system of claim 1, further comprising a processor and a cache memory associated with the processor, wherein the plurality of elements of the data structure are each cache aligned with the cache memory.

3. The system of claim 1, wherein the first process is to write an acknowledgement to the second region responsive to writing the result including the value of the updated target variable in the second region, and the second process is responsive to the acknowledgement to read the result from the second region, the acknowledgement being an element of the data structure.

4. The system of claim 3, wherein the second process is to retrieve, based on the acknowledgement, the result from the second region.

5. The system of claim 3, wherein the request comprises a first counter advanced by the second process to request for the atomic operation, and the acknowledgment comprises a second counter advanced by the first process responsive to a completion of the atomic operation.

6. The system of claim 1, wherein the second process is to write a variable associated with the atomic operation to the first region.

7. The system of claim 6, wherein the variable comprises any or a combination of a parameter identifying the target variable, a parameter identifying the atomic operation, a parameter used to update the target variable, and a parameter used to compare with the target variable.

8. The system of claim 1, wherein the second process is to write the request by:
writing the request to a cache memory of a computing node on which the second process is executable; and
persisting the request from the cache memory to the first region of the shared memory.

9. The system of claim 8, wherein the first process is to cause invalidation of the request in the cache memory in response to the first process being ready to service the request.

10. The system of claim 1, wherein the first process is to write the result to the second region by:
writing the result to a cache memory of a computing node on which the first process is executable; and
persisting the result from the cache memory to the second region of the shared memory.

11. The system of claim 10, wherein the second process is to cause invalidation of the result in the cache memory in response to the second process being ready to retrieve the result from the second region.

12. The system of claim 1, further comprising a third process of the plurality of processes designated as being allowed to update the target variable in the data structure stored in the shared memory, the first process and the third process to synchronize access to the target variable.

13. The system of claim 12, wherein the first process and the third process are executable on a single computing node or on a plurality of computing nodes.

14. The system of claim 1, wherein the first process is executable on a processing circuit separate from a main processor on which another process of the plurality of processes is executable.

15. The system of claim 14, wherein the processing unit is selected from among a general processing unit (GPU), a memory accelerator, a network interface controller, and a virtual process.

16. A non-transitory machine-readable storage medium storing instructions that upon execution cause a first process on a computing node to:
read a first cache-aligned element comprising a request stored in a first region in a shared memory accessible over a network fabric, the request for an atomic operation, and the first cache-aligned element written to the first region by a second process;
perform the atomic operation on a target variable stored in the shared memory without utilizing a hardware-specific atomic operations function, the atomic operation updating the target variable, the target variable in the shared memory updateable by the first process but the second process does not have permission to update the target variable; and
write a value of the updated target variable as a second cache-aligned element to a second region in the shared memory, the second region readable by the second process to retrieve the value of the updated target variable, wherein the first region is writeable by the second process but not by the first process, and the second region is writeable by the first process but not by the second process.

17. The non-transitory machine-readable storage medium of claim 16, wherein the computing node comprises a cache memory, and the first cache-aligned element and the second cache-aligned element each has size that is equal to a multiple of a width of a cache line of the cache memory, and each of the first cache-aligned element and the second cache-aligned element starts on a cache-aligned boundary.

18. A method of a system comprising a hardware processor, comprising:

assigning a master process allowed to update a target variable in a shared memory on behalf of a plurality of processes that have access to the shared memory;

allocating a first memory region to the master process;

allocating a second memory region to a participating process of the plurality of processes;

writing, by the participating process, a request to the second memory region, the request specifying an atomic operation on the target variable;

reading, by the master process, the request from the second memory region;

in response to the request, performing, by the master process, the atomic operation to update the target variable without utilizing a hardware-specific atomic operations function;

writing, by the master process, a result including a value of the updated target variable to the first memory region; and reading, by the participating process, the result including the value of the updated target variable from the first memory region, wherein the participating process does not have permission to update the target variable, and wherein the first memory region is writeable by the participating process but not by the master process, and the second memory region is writeable by the master process but not by the participating process.

\* \* \* \* \*